W. M. CARR.
MELTING APPARATUS.
APPLICATION FILED NOV. 2, 1908.
929,831.
Patented Aug. 3, 1909.
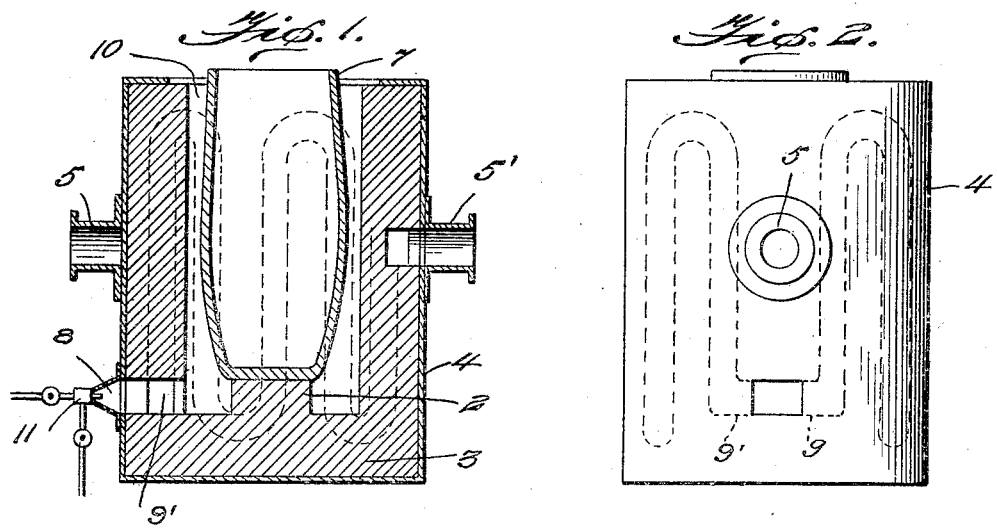
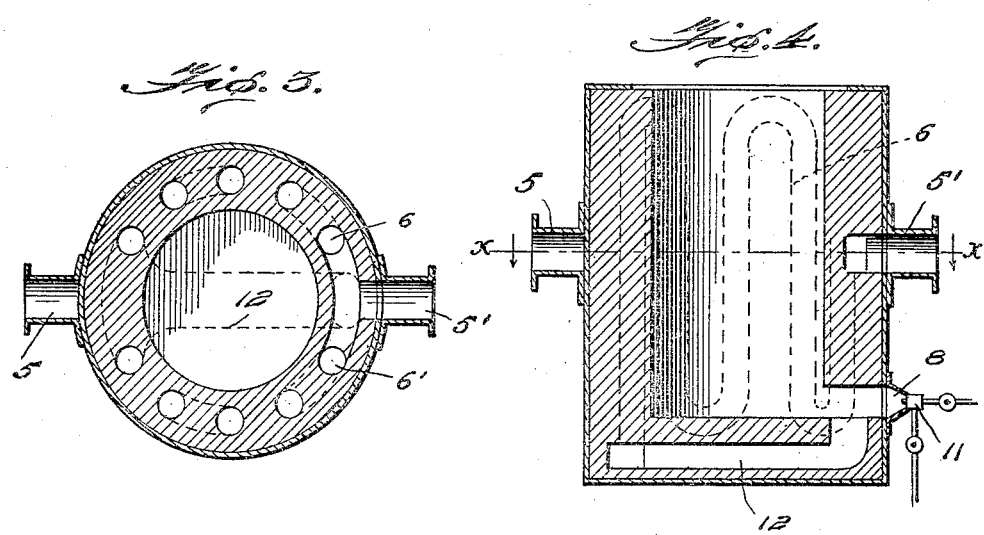
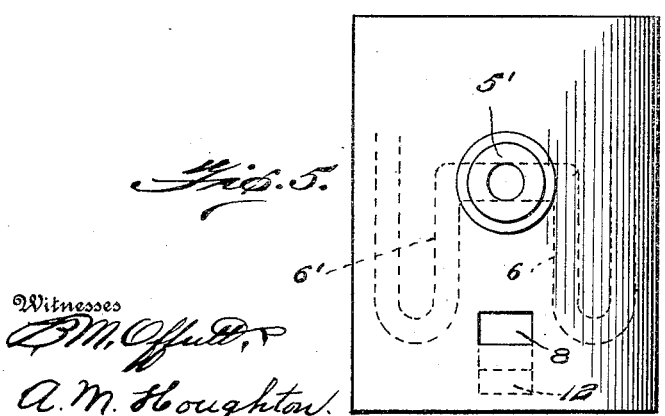
Witnesses
O. M. Offutt
A. M. Houghton
Inventor
William M. Carr
By K. P. McElroy
Attorney

UNITED STATES PATENT OFFICE.

WILLIAM M. CARR, OF NEW YORK, N. Y., ASSIGNOR OF ONE-HALF TO CHARLES H. SPEER, OF CHESTER, PENNSYLVANIA.

MELTING APPARATUS.

No. 929,831. Specification of Letters Patent. Patented Aug. 3, 1909.

Application filed November 2, 1908. Serial No. 460,754.

*To all whom it may concern:*

Be it known that I, WILLIAM M. CARR, a citizen of the United States, residing at New York, in the county of New York and State of New York, have invented certain new and useful Improvements in Melting Apparatus, of which the following is a specification.

This invention relates to melting apparatus; and it comprises an inner vessel for metal and like materials inclosed in and spaced away from a casing of refractory material to form a relatively narrow flame-space therebetween, said casing including air passages, means for producing flame in said flame space, and, preferably, means for tilting or rocking the entire apparatus; all as more fully hereinafter set forth and as claimed.

In melting steel and other high-melting materials in crucibles and other containers, it is of course desirable to use thin-walled vessels, conduction of heat through most refractory materials being relatively slow, but for mechanical reasons, the thinness cannot be great since ordinarily the crucibles must be handled more or less, being removed from the furnace with tongs, for instance, and poured. With thicker-walled vessels adapted better for handling, conduction of heat is slow, necessitating a higher degree of temperature without the crucible in order to produce a given temperature therein in a given time. And with either thick or thin walls, but more particularly with the former, it is necessary to have very even heating since irregularities produce cracking and lessen the life of the crucible. The violent temperature changes on removing a crucible and pouring are of course very detrimental.

In the present invention, it is intended to obviate the stated disadvantages of the ordinary forms of apparatus and produce certain new advantages by providing a cheap, simple and efficient type of melting apparatus in which crucible and furnace are combined to form a relatively small, portable structure from which, if desired, the molten materials may be poured directly without exposure of the melting vessel to air. To this end, the melting vessel proper, which may be of any suitable refractory material, such as plumbago, fireclay, etc., is mounted in and inclosed by a suitable casing of refractory material, such as ordinary fireclay, etc., leaving an annular comparatively narrow unobstructed passageway therebetween to serve as a flame chamber. Since the rapidity of combustion (and concomitant degree of elevation of temperature) depends very much on the presence of solid matter on, and in the pores of which, combustion can take place, and since such combustion in gas layers depends also, further, upon heat radiated thereinto to initiate and accelerate ignition, the thin, refractory-walled passage thus afforded gives ideal conditions for rapid combustion and high temperatures; and particularly when concentrated fuel, such as oil, and superheated air are used to produce combustion. The degrees of temperature which can thus be obtained are, however, apt to be more or less perilous to ordinary refractory materials when used in the described casing. The refractory material of the melting vessel proper is shielded by the absorption of heat by metal melting therein, but the casing unless so thin as to provide for efficient air-cooling, is apt to yield interiorly to the high temperature, while if thin walled the great temperature differential between the inside and outside is apt to cause cracking and checking. For this reason, in the present invention the refractory casing is provided with air-spaces or passages, passages being preferably employed and these passages so located within the body of the casing itself that no portion of the heated interior surface is very far away from an air channel. Since a dead body of air in these spaces or passages would not produce the desired result, the air is kept in circulation in amount sufficient to produce the necessary amount of cooling. This air being heated is advantageously used in connection with the firing means, thereby restoring to the flame the amount of heat abstracted from the casing, the apparatus acting recuperatively.

For the present purposes, it is desirable that the fuel employed be of a concentrated nature, such as oil or rich gas, since to obtain the described wall effects it is desirable that the flame passage be as narrow as practicable. Fuel oil is suitable. It is also desirable that the whole apparatus be relatively small, both so that it may be portable and handled as readily as a crucible alone and also because the described wall effects are more readily obtained in small sizes.

The combustion accelerating effect of a heat-radiating wall diminishes geometrically with the distance therefrom. It may be, and preferably is, mounted on trunnions so that metal, etc., may be poured from the inner container by simple tilting; such trunnions further furnishing a convenient means for picking up the apparatus by cranes and the like.

In the accompanying illustration is shown, more or less diagrammatically, one of the various possible embodiments of the described invention.

In this showing:—Figure 1 shows a vertical section of one form of apparatus, certain interior passages being shown in dotted lines; Fig. 2 is a side-view of the same structure; Fig. 3 is a horizontal section of Fig. 4 on line $x$—$x$; Fig. 4 is a vertical section of a modified form; and Fig. 5 is a side view of the same form.

Referring first to Fig. 1, 1 is a metal-container, shown as an ordinary crucible pot though it may have other forms, resting on pedestal 2. The pedestal is shown as extending up from the bottom of casing 3. This casing and the pedestal may be of brickwork or of molded refractory material; and the melting vessel may be integral with pedestal and casing. Exteriorly, the casing is preferably held in and protected by an iron casing 4. Hollow trunnions 5 and 5', on opposite sides of the casing, afford a convenient attachment whereby the apparatus may be picked up by a crane; or means for rotating or tilting the apparatus for casting metal when mounted in suitable bearings (not shown). Through one of these trunnions (5), air may be introduced from any suitable source of low-pressure air, such as a fan (not shown). Within the material of the refractory casing are two circuitous flues, 6 and 6', extending from the port afforded by the trunnion to the opposite side of the casing. These flues may be either formed in the plastic material or built-in if brickwork be used, and may or may not be lined with metal, or formed from metal piping. For present purposes, however, there is no special utility in the use of metal in this relation. At the opposite side of the casing, these flues enter the firing port 8 at 9 and 9'. This firing port communicates with the interior of the casing and therefore with the flame passage 10 between the container for metal and the casing. Entering this port is oil burner 11.

The structures of Figs. 3, 4 and 5 are much the same, though the pedestal and metal-container are omitted for the sake of simplicity, save that the hollow trunnion for admission of air and the burner are on the same side, the air passing through the circuitous passages to the other side of the casing as before and then being returned to the burner-side by means of a flue 12 formed in the base of the casing.

The operation of this apparatus is obvious from the foregoing. Oil entering from the burner is met by superheated air which has traversed the casing, cooling the same to the necessary degree, and forms a flame which passes up the comparatively narrow annular unobstructed passageway between casing and container, bathing the container with a uniformly developed flame body. Being subjected both to the catalytic effect of the glowing material of the walls and to intense radiation therefrom, combustion is quick and intense, a very high temperature degree being readily attained, while the circulating air cools the casing below the danger point, returning the abstracted heat to the flame. The refractory casing being comparatively thick, losses by exterior radiation are minimized and a very high temperature can be attained and maintained with a comparatively small expenditure of fuel. The air employed in combustion being superheated and the combustion accelerated by the glowing walls of the narrow passage, but a small excess of air over that theoretically necessary need be employed, thereby avoiding loss of heat, reduction of temperature and stratification and irregularity of flame.

While for low-temperature operations, the inner container may be of iron or other metal, it is generally preferable to use a container of graphite, fireclay or other refractory material, both because of the high temperatures which tend to be produced and because it adds its quota to producing the effect of the hot-walled flame passage. Since the container itself need not be removed from the casing or handled, and indeed may be integral with the casing itself, it need not be thicker-walled than is necessary to withstand the hydrostatic pressure of contained molten metal; i. e., may be so thin as to permit a comparatively ready permeation of heat therethrough.

The apparatus is particularly adapted for melting steel, copper, brass and other high-melting materials, but may be used for other purposes. In melting and casting metals, it is obvious that the apparatus is at once crucible, furnace and ladle.

What I claim is:—

1. A melting apparatus comprising a container, a refractory casing surrounding the same and spaced away therefrom to form an unobstructed narrow flame passage, said casing being provided with an air space for cooling the same, and firing means for producing flame within said flame passage, said firing means being supplied with air from said space.

2. A melting apparatus comprising a container, a refractory casing surrounding the same and spaced away therefrom to form an unobstructed narrow flame passage, said casing being provided with contained air conduits adjacent to all points in said passage, and firing means for producing flame within said flame passage, said firing means being supplied with air from said conduits.

3. A melting apparatus comprising a container, a refractory casing surrounding the same and spaced away therefrom to form an unobstructed narrow flame passage, said casing being provided with contained tortuous air conduits adjacent to all points in said passage, and firing means for producing flame within said flame passage, said firing means being supplied with air from said conduits.

4. A melting apparatus comprising a container, a refractory casing surrounding the same and spaced away therefrom to form an unobstructed narrow flame passage, said casing being provided with contained air spaces within the refractory material of the casing for cooling the same, said air spaces being adjacent to all points in said passage, firing means for producing flame within said flame passage, said firing means being supplied with air from said spaces, and means for transporting and tilting the apparatus as a whole.

5. A melting apparatus comprising a container, a refractory casing surrounding the same and spaced away therefrom to form an unobstructed narrow flame passage, said casing being provided with hollow trunnions and a contained air conduit adjacent to all points in said passage communicating with a trunnion, and firing means for producing flame within said flame passage, said firing means being supplied with air from said conduit.

In testimony whereof, I affix my signature in the presence of witnesses.

WILLIAM M. CARR.

Witnesses:
  W. J. REED,
  N. G. FORWORD.